(12) United States Patent
Kim (10) Patent No.: US 7,139,059 B2
(45) Date of Patent: Nov. 21, 2006

(54) LOWER SUBSTRATE, IPS MODE LIQUID CRYSTAL DISPLAY DEVICE AND METHOD FOR MANUFACTURING THE SAME

(75) Inventor: Woong Kwon Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 191 days.

(21) Appl. No.: 10/967,260

(22) Filed: Oct. 19, 2004

(65) Prior Publication Data

US 2005/0110930 A1    May 26, 2005

(30) Foreign Application Priority Data

Nov. 26, 2003    (KR) ..................... 10-2003-0084626

(51) Int. Cl.
*G02F 1/1368* (2006.01)
*G02F 1/1343* (2006.01)
*G02F 1/139* (2006.01)

(52) U.S. Cl. ..................... 349/141; 349/106; 349/187

(58) Field of Classification Search ............... 349/106, 349/110, 111, 141, 147, 187; 438/30
See application file for complete search history.

(56) References Cited

U.S. PATENT DOCUMENTS

| 5,907,379 | A | * | 5/1999 | Kim et al. .................. 349/141 |
| 6,400,436 | B1 | | 6/2002 | Komatsu |
| 6,650,389 | B1 | | 11/2003 | Sakamoto |
| 2001/0046018 | A1 | | 11/2001 | Ham |
| 2002/0101557 | A1 | | 8/2002 | Ono et al. |
| 2003/0025857 | A1 | | 2/2003 | Ochiai et al. |
| 2003/0133066 | A1 | | 7/2003 | Ono et al. |
| 2003/0184699 | A1 | | 10/2003 | Matsumoto et al. |
| 2003/0197825 | A1 | | 10/2003 | Lee et al. |
| 2004/0169808 | A1 | | 9/2004 | Shih et al. |

OTHER PUBLICATIONS

Copy of Search Report from U.K. Patent Office.
Copy of comunication from French Patent Office.

* cited by examiner

*Primary Examiner*—Toan Ton
*Assistant Examiner*—Tai Duong
(74) *Attorney, Agent, or Firm*—McKenna Long & Aldridge LLP (57) ABSTRACT

A lower substrate for an IPS mode LCD device includes a substrate; a gate line formed on the substrate; a data line formed on the substrate crossing the gate line, a pixel region defined by intersections of the gate line with the first and second date lines; a thin film transistor connected to the first gate line and the first data line; a pixel electrode formed at the pixel region and connected to the thin film transistor, the pixel electrode having a plurality of first bars and having a stacked structure of a transparent metal layer and a colored metal layer; a common electrode formed overlapping the gate line, the data line and the thin film transistor, the common electrode having a plurality of second bars integrated with the first bars of the pixel electrode, and having a stacked structure of a transparent metal layer and a colored metal layer; and a color filter layer disposed at positions corresponding to the pixel region of the substrate.

26 Claims, 12 Drawing Sheets

LOWER SUBSTRATE, IPS MODE LIQUID CRYSTAL DISPLAY DEVICE AND METHOD FOR MANUFACTURING THE SAME

The present invention claims the benefit of Korean Patent Application No. 2003-0084626, filed in the Republic of Korea on Nov. 26, 2003, which is hereby incorporated by reference.

BACKGROUND OF THE INVENTION

1. Field of the Invention

The present invention relates to a liquid crystal display device, and more particularly, to a lower substrate, an IPS mode liquid crystal display device and method for manufacturing the same.

2. Description of the Related Art

Generally, the liquid crystal display (LCD) device is manufactured by attaching an upper substrate to a lower substrate and injecting a liquid crystal between the upper and the lower substrates. A polarizing film and a retardation film have been attached to the outer surfaces of the upper and the lower substrates. An LCD device manufactured in this manner has a brightness and a high contrast because of changing the direction of light incident or changing a refractive index.

Normally, the LCD device incorporates a twisted nematic (TN) mode liquid crystal. However, such a TN-mode LCD device is not suitable for realizing a large-sized screen because the light transmittance changes in the gray scale display depending on a viewing angle.

To solve this problem, the in-plane switching (IPS) mode LCD device, which uses a horizontal electric field, has been suggested. The IPS mode LCD device has advantages in that contrast characteristics and viewing angle characteristics, for example, gray inversion and color shift are improved, as compared to the TN mode LCD device.

In the IPS mode LCD device, a pixel electrode and a common electrode are formed in the same plane on the lower substrate where a thin film transistor is arranged. At this time, the liquid crystal is operated by a fringe field formed between the pixel electrode and the common electrode. A color filter layer where a red sub-filter R, a green sub-filter G, and a blue sub-filter B having the sequential arrangement are formed on the upper substrate facing the lower substrate. The color filter layer can be formed by a pigment dispersing method, a dyeing, or a deposition method.

Figure 1:
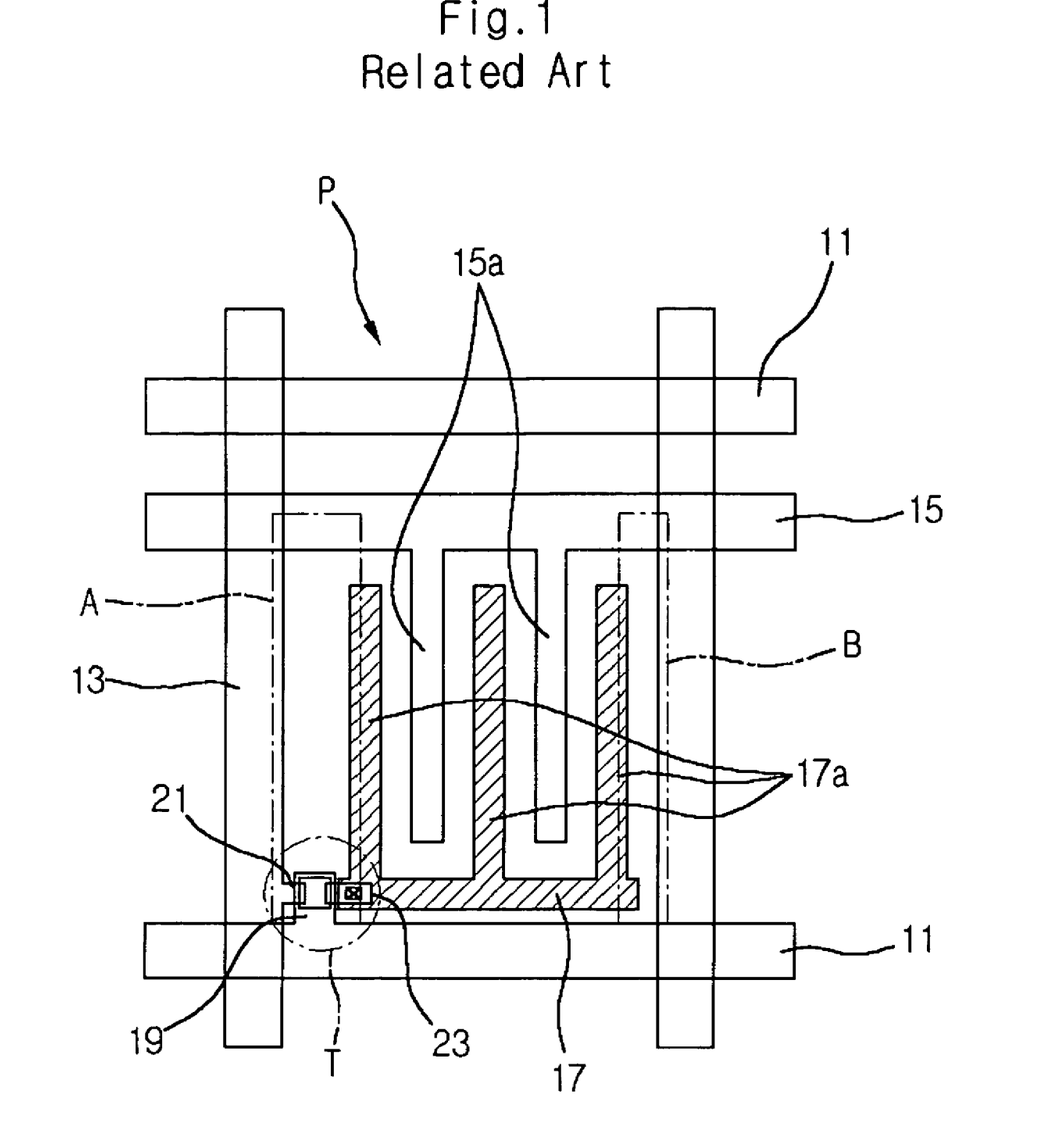
FIG. 1 is a partial plane view of a lower substrate in an IPS mode LCD device according to the related art.

FIG. 1 is a partial plane view of a lower substrate of the IPS mode LCD device according to the related art. Referring to FIG. 1, on the lower substrate of the IPS mode LCD device according to the related art, a gate line 11 and a data line 13 are formed perpendicularly to cross each other, and a common electrode 15 is formed in parallel and in the same direction with the gate line 11.

A pixel region P is defined by the intersection of the gate line 11 and the data line 13. And, pixel region P includes the common electrode 15 and the pixel electrode 17 forming a finger shape, and patterned in an integrated manner. Namely, the common electrode 15 formed in parallel and in the same direction with the gate line 11, has a plurality of common electrode bars 15a formed vertically protruding and extending from the common electrode 15.

At the cross point where the gate line 11 and the data line 13 intersects each other, a thin film transistor T as a switching device is formed. The thin film transistor T includes a gate electrode 19 connected to the gate line 11, a source electrode 21 connected to the data line 13, and a drain electrode 23 connected to the pixel electrode 17. As in the case of the common electrode 15, a plurality of pixel electrode bars 17a are formed vertically to protrude and extend from the pixel electrode 17. The plurality of pixel electrode bars 17a and the plurality of common electrode bars 15a are alternately integrated.

Accordingly, when a predetermined voltage is applied to the pixel electrode 17 and the common electrode 15, a fringe field is distributed between each of the pixel electrode bars 17a and each of the common electrode bars 15a. The alignment of the liquid crystal molecules is varied depending on the fringe field, where an image is displayed.

However, in the IPS mode LCD device of the related art, as shown in FIG. 1, part A and part B (e.g., region between the data line 13 and the outermost pixel electrode bar 17a) represented by a dotted line at both ends of the pixel region P do not correspond to the pixel electrode bar 17a nor the common electrode bar 15a. Unlike the central region of the pixel region P, the liquid crystals disposed on the parts A and the B cannot operate properly, thus becoming a major factor in image quality deterioration.

To solve such a problem, a black matrix (hereinafter referred to as BM) layer is formed on a specific region on the upper substrate (not shown) that corresponds to the matching lower substrate. Namely, the BM layer is formed on the region of the upper substrates that corresponds to the rest region where the pixel electrode bars 17a and the common electrode bars 15a are formed. Since the BM layer is formed on the upper substrate that corresponds to the above-described A and B parts, it is possible to prevent light from being leaked out of parts A and B, except the display region. However, there still exists a problem that the aperture ratio is reduced as the region where the BM layer is formed is widened.

To overcome such a problem, a structure has been developed to cover a part of the upper part of the data line 13 by the common electrode bars 15a protruded and extended from the common electrode 15.

Figure 2:
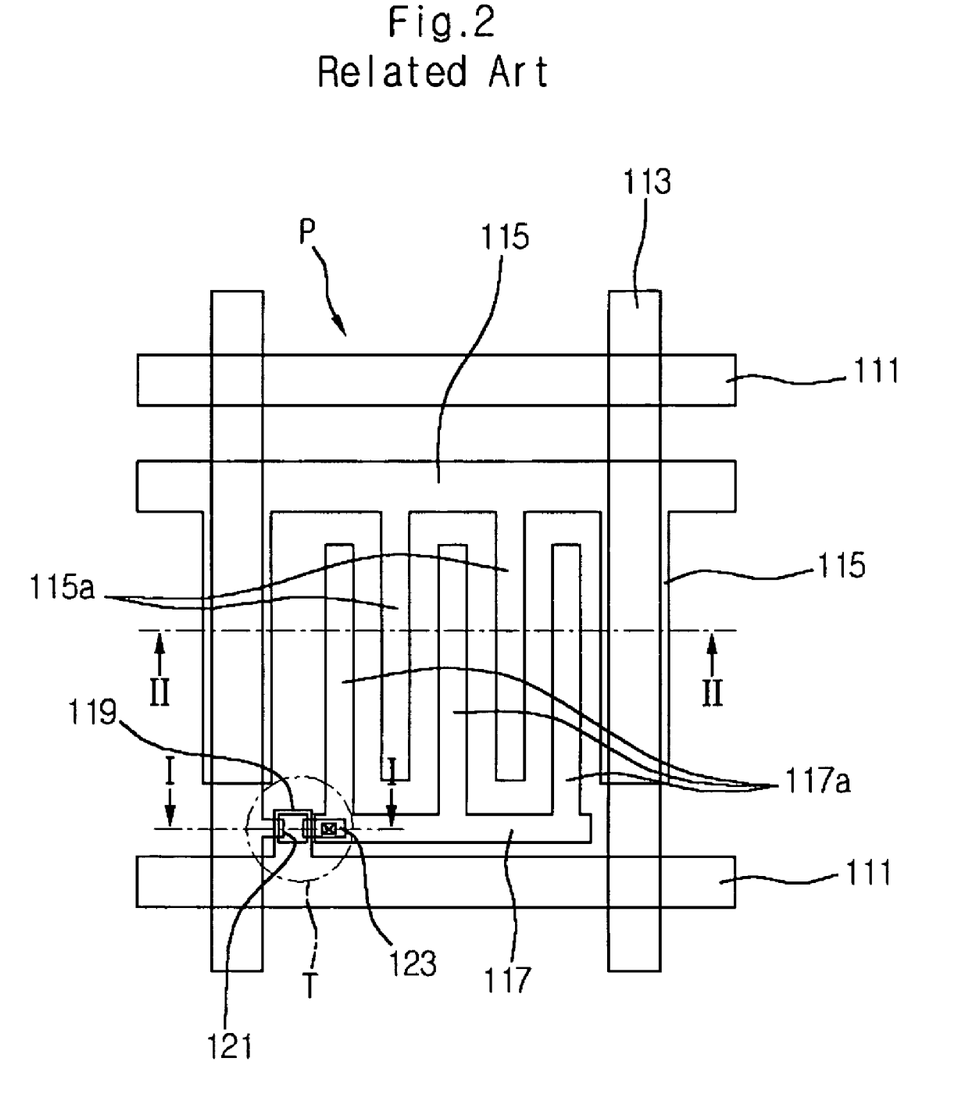
FIG. 2 is a partial plane view of a lower substrate in another IPS mode LCD device according to the related art.

FIG. 2 is a partial plane view of a lower substrate in another IPS mode LCD device according to the related art. To solve the above problem, an insulating layer (not shown) made of a transparent organic insulating material (for example, photo acryl) having a low dielectric constant is disposed on a data line 113. A common electrode 115, a plurality of common electrode bars 115a, a pixel electrode 117, and a plurality of pixel electrode bars 117a are formed on the insulating layer. At this time, the common electrode bars 115a are partially formed over the data line 113.

As shown in FIG. 2, the lower substrate is provided with a gate line 111, the data line 113 is perpendicularly intersecting the gate line 111, and the common electrode 115 is formed in parallel with and in the same direction as the gate line 111. A pixel region (P) is defined by the intersection of the gate line 111 and the data line 113.

The common electrode 115 and the pixel electrode 117 are patterned in a finger-shaped structure integrating in the pixel region (P). The common electrode 115 has the plurality of common electrode bars 115a vertically protruding therefrom. And, the plurality of common electrode bars 115a are partly overlapping the data line 113.

At an intersection point of the gate line 111 and the data line 113, a thin film transistor (T) is formed as a switching element. The thin film transistor (T) has a gate electrode 119 connected to the gate line 111, a source electrode 121 connected to the data line 113 and a drain electrode 123 connected to the pixel electrode 117.

The pixel electrode 117 has the plurality of pixel electrode bars 117a vertically protruding from the pixel electrode 117, like in the common electrode 115. And, the pixel electrode bars 117a are integrated with the common electrode bars 115a.

Accordingly, since the related art IPS mode liquid crystal display device shown in FIG. 2 has the common electrode bar formed even on the data line 113, as compared to FIG. 1, a fringe field is distributed in wider areas (i.e., regions A and B in FIG. 1). Accordingly, the IPS mode LCD device operates normally. Therefore, even though a black matrix (BM) layer is not formed on an upper substrate corresponding to the regions A and B shown in FIG. 1, the related art IPS mode LCD device shown in FIG. 2 can improve the aperture ratio.

Figure 3A:
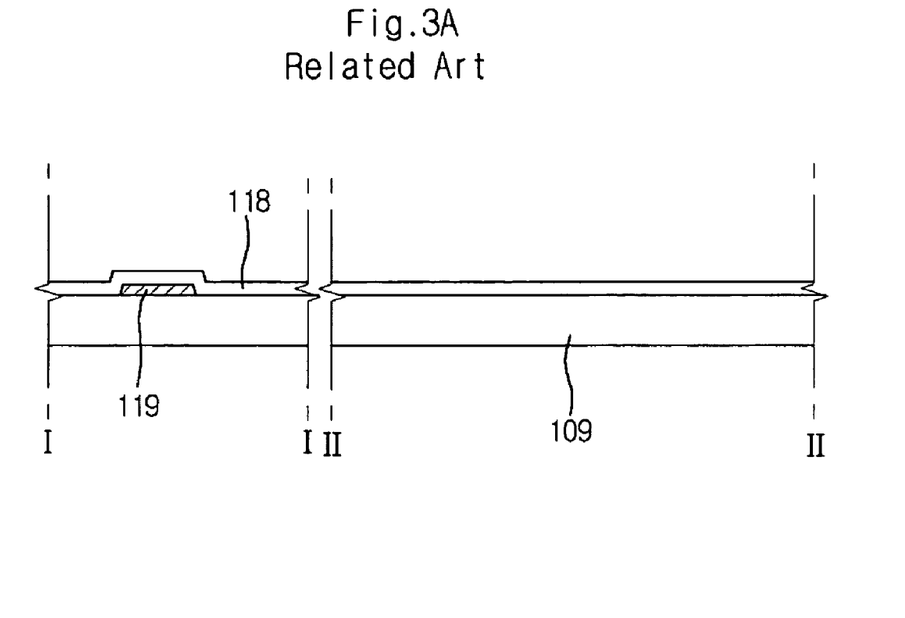
FIGS. 3A through 3C are sectional views taken along cross-sectional lines I—I and II—II of FIG. 2.
Figure 3B:
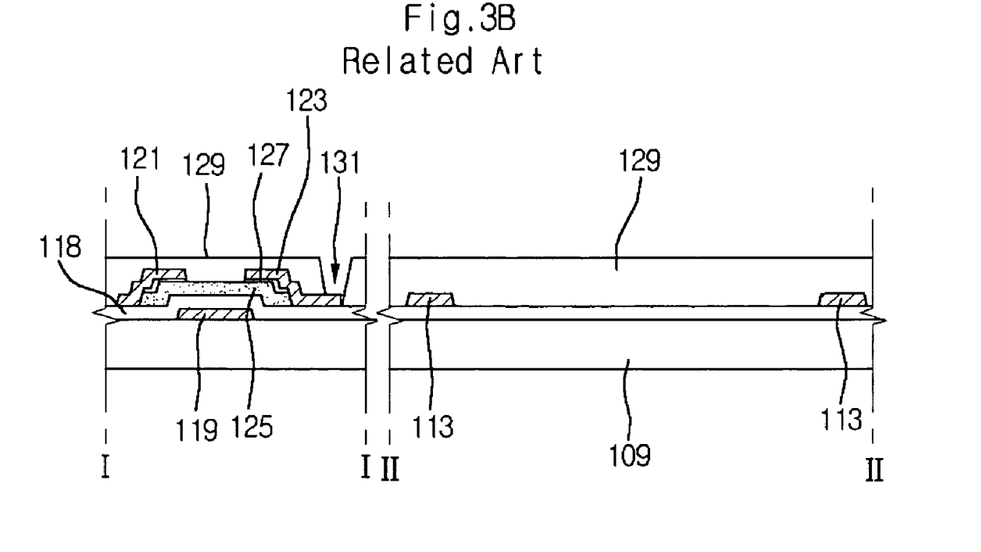
Figure 3C:
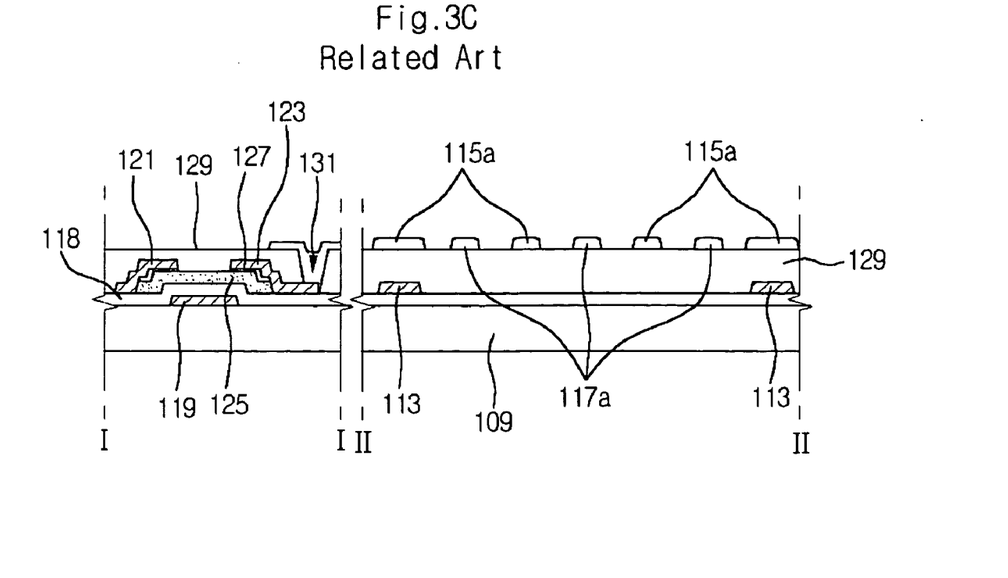

FIGS. 3A to 3C are sectional views illustrating a manufacturing method taken along cross-sectional lines I—I and II—II of FIG. 2.

First, as shown in FIG. 3A, a conductive metal is deposited and patterned on a substrate 109 to form a gate line 111 and a gate electrode 119. Next, an inorganic insulating material (for example, a silicon nitride film (SiNx) and a silicon oxide film (SiO$_2$)) or an organic insulating material (for example, acryl resin or benzocyclobutene (BCB)) is deposited on an entire surface of the substrate 109 including the gate line 111 thereby forming a gate insulating layer 118.

Thereafter, as shown in FIG. 3B, an intrinsic amorphous silicon (a-Si) and an impurity-doped amorphous silicon (n$^+$ a-Si) are deposited on the entire gate insulating layer 118. Thereafter, the resultants are patterned to form an active layer 125 and an ohmic contact layer 127. Next, a conductive metal is deposited and patterned on the ohmic contact layer 127, thereby forming the data line 113, the source electrode 121 and the drain electrode 123.

After that, a low dielectric constant material (for example, BCB or acryl resin) is deposited on an entire surface of the substrate including the data line 113 and the like, thereby forming a passivation layer 129, and is patterned to form a drain contact hole 131 such that a portion of the drain electrode 123 is exposed to an exterior.

As shown in FIG. 3C, a transparent conductive metal (for example, indium-tin-oxide (ITO) and indium-zinc-oxide (IZO)) is deposited and patterned to form common electrode bars 115a and pixel electrode bars 117a, such that they are integrated with each other. Further, the common electrode 115 and the pixel electrode 117 are respectively formed to be connected with the common electrode bars 115a and the pixel electrode bars 117a. At this time, some of the common electrode bars 115a are overlapped with the data line 113 with interposing the passivation layer 129 therebetween.

By doing so, the related art IPS mode LCD device in FIG. 2 overcomes the drawback in which the liquid crystal molecules are abnormally operated in the regions A and B of FIG. 1 to deteriorate picture quality, thereby improving the aperture ratio. However, in the related art IPS mode LCD device of FIG. 2, the passivation layer 129 has a heavy thickness at a lower side of the common electrode 115 and the pixel electrode 117. Accordingly, the related art IPS mode LCD device in FIG. 2. has a disadvantage in that a back light (not shown), irradiated from the external of the substrate, has a reduced light transmittance due to the thick passivation layer 129.

Figure 4:
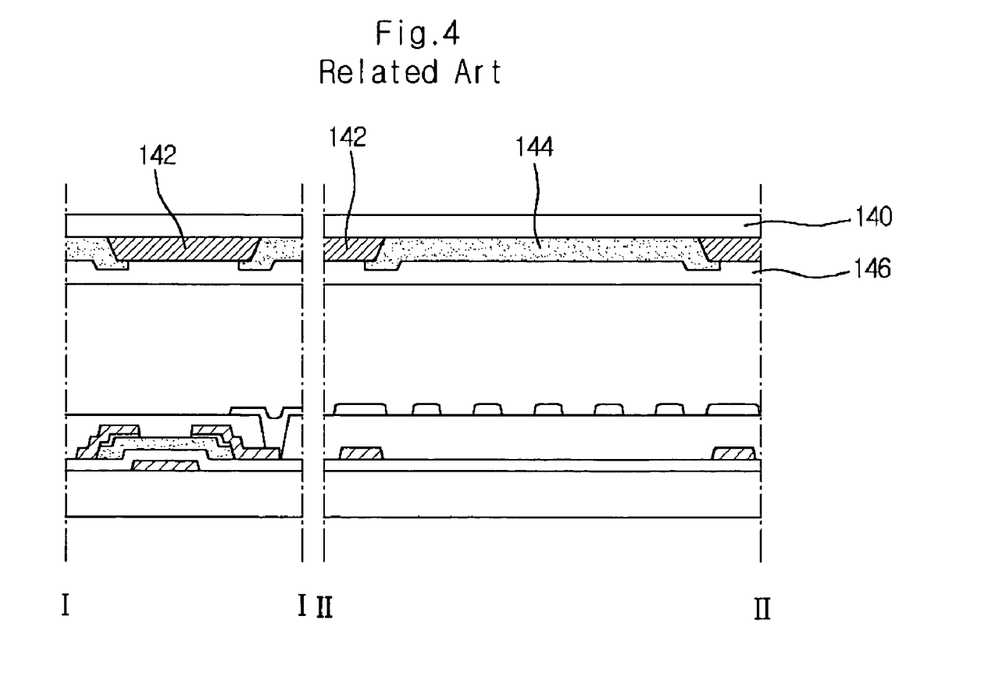
FIG. 4 is a sectional view of the lower substrate taken along cross-sectional lines I—I and II—II of FIG. 2, and an upper substrate corresponding to the matching lower substrate.

FIG. 4 is a sectional view of the lower substrate taken along cross-sectional lines I—I and II—II of FIG. 2, and an upper substrate corresponding to the matching lower substrate.

Referring to FIG. 4, a further description regarding the lower substrate will be omitted since the lower substrate is identical with that of FIG. 3C. The upper substrate 140 facing the lower substrate includes a color filter layer 144 having a red (R) sub-color filter, a green (G) sub-color filter, and a blue (B) sub-color filter, in which an appropriate color filter layer is provided to match with each of the pixel regions (P) provided at the lower substrate. A BM layer 142 is formed to cover the region between the sub-color filters and a thin film transistor portion of the lower substrate. An over coat (hereinafter, referred to as "OC") layer 146 is formed on the color filter layer 144 and the BM layer 142. At this time, a liquid crystal layer (not shown) is interposed between the upper substrate 140 and the lower substrate 109.

The aforementioned related art IPS mode LCD device has a drawback of a complex process and a high manufacturing cost due to the color filter layer 144, the BM film 142 and the OC layer 146 formed on the upper substrate 140. Further, it has a drawback in that the upper substrate did not have a construction referred as a cell combination margin of the upper and lower substrates, when the upper substrate was attached with the lower substrate.

Recently, there is proposed a structure in which a color filter layer is formed on a lower substrate to prevent the misalignment of the LCD device and a BM layer having a reduced width to improve an aperture ratio. A structure of forming the color filter layer under a thin film transistor (TFT) is called as a thin film transistor on color filter (TOC), and a structure of forming a color filter layer over the TFT is called as a color filter on thin film transistor (COT).

In the TOC structure, only the BM layer and the OC layer are formed on the upper substrate. At this time, the BM layer is able to not only preventing light from being leaked through regions other than a pixel region, but also shielding light from being incident to the TFT, thereby preventing optical current from being generated. However, when the BM layer is provided on the upper substrate, there is a drawback in that a slant incident light or some light reflected from the BM layer film cannot be prevent since the BM layer film and the TFT are spaced apart from each other.

SUMMARY OF THE INVENTION

Accordingly, the present invention is directed to a lower substrate, an IPS mode LCD device and method for manufacturing the same that substantially obviates one or more problems due to the limitations and the disadvantages of the related art.

An object of the present invention is to provide a lower substrate for an IPS mode LCD device with improved aperture ratio.

Another object is to provide a simplified method for manufacturing the lower substrate of an IPS mode LCD device.

Additional advantages of the invention will be set forth in the description which follows, and in part will become apparent from the description, or may be learnt by practice of the invention. These advantages of the invention will be realized and attained by the structure particularly pointed out in the written description and claims hereof as well as the appended drawings.

To achieve these and other advantages, and in accordance with the purpose of the invention, as embodied and broadly described, a lower substrate for an IPS mode LCD device comprises a substrate; a gate line formed on the substrate; a data line formed on the substrate crossing the gate line, a pixel region defined by intersections of the gate line with the first and second date lines; a thin film transistor connected to the first gate line and the first data line; a pixel electrode formed at the pixel region and connected to the thin film transistor, the pixel electrode having a plurality of first bars and having a stacked structure of a transparent metal layer and a colored metal layer; a common electrode formed overlapping the gate line, the data line and the thin film transistor, the common electrode having a plurality of second bars integrated with the first bars of the pixel electrode and having a stacked structure of a transparent metal layer and a colored metal layer; and a color filter layer disposed at positions corresponding to the pixel region of the substrate.

In another aspect, an IPS mode LCD device comprises a lower substrate including a substrate, first and second of gate lines formed on the substrate, a data line formed on the substrate crossing the gate line, a pixel region defined by intersections of the gate line with the first and second date lines, a thin film transistor connected to the first gate line and the first data line, a pixel electrode formed at the pixel region and connected to the thin film transistor, the pixel electrode having a plurality of first bars and having a stacked structure of a transparent metal layer and a colored metal layer, and a common electrode formed overlapping the gate line, the data line and the thin film transistor, the common electrode having a plurality of second bars integrated with the first bars of the pixel electrode and having a stacked structure of a transparent metal layer and a colored metal layer; and a color filter layer disposed at positions corresponding to the pixel region of the substrate; an upper substrate spaced by a predetermined interval from the lower substrate; and a liquid crystal layer interposed between the upper substrate and the lower substrate.

In another aspect, a method for manufacturing a lower substrate for an IPS mode LCD device comprises forming a gate line on a substrate; forming a data line on the substrate to cross the gate line, a pixel region defined by intersections of the gate line with the data line; forming a thin film transistor connected to the first gate line and the first data line; forming a color filter layer on the pixel region including the gate line, the data line and the thin film transistor; and forming a pixel electrode and a common electrode on the color filter layer, the pixel electrode being connected to the thin film transistor and having a plurality of first bars, the common electrode overlapping the gate line, the data line and the thin film transistor and having a plurality of second bars integrated with the plurality of first bars of the pixel electrode, and the common electrode having a stacked structure of a transparent metal layer and a colored metal layer.

In another aspect, a method for manufacturing an IPS mode LCD device comprises forming a gate line on a substrate, forming a data line on the substrate to cross the gate line, a pixel region defined by intersections of the gate line with the data line; forming a thin film transistor connected to the first gate line and the first data line; forming a color filter layer on the pixel region including the gate line, the data line and the thin film transistor; forming a pixel electrode and a common electrode on the color filter layer, the pixel electrode being connected to the thin film transistor and having a plurality of first bars, the common electrode overlapping the gate line, the data line and the thin film transistor and having a plurality of second bars integrated with the plurality of first bars of the pixel electrode, and the common electrode having a stacked structure of a transparent metal layer and a colored metal layer; joining an upper substrate with the lower substrate with a predetermined interval therebetween; and interposing a liquid crystal layer between the upper substrate and the lower substrate.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this specification, illustrate embodiment(s) of the present invention and together with the description serve to explain the principle of the present invention.

DETAILED DESCRIPTION OF PREFERRED EMBODIMENTS

Reference will now be made in detail to the preferred embodiments of the present invention, examples of which are illustrated in the accompanying drawings.

Figure 5:
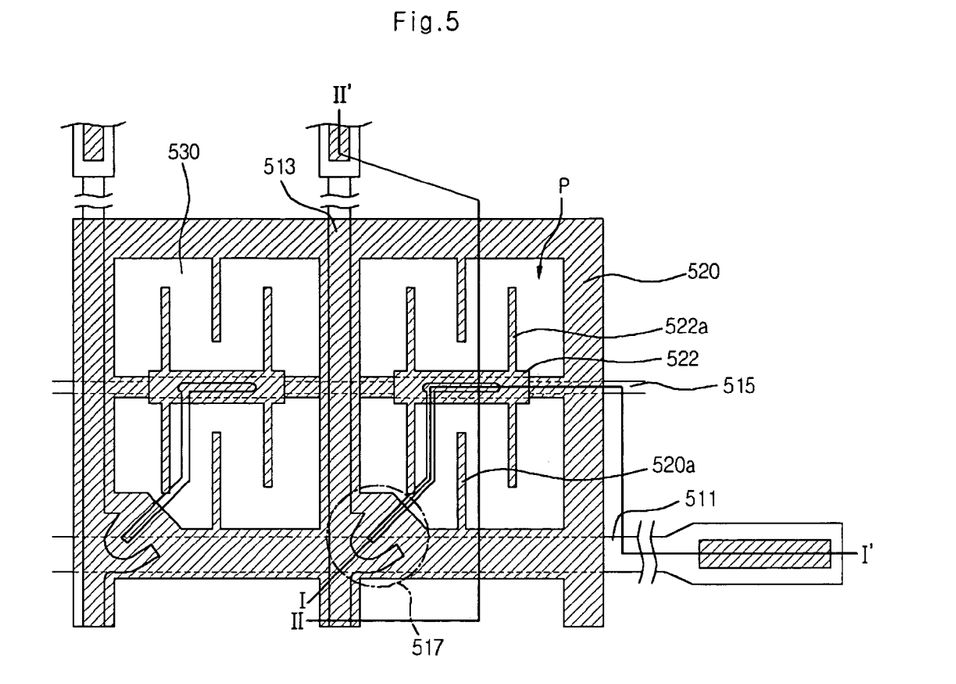
FIG. 5 is a partial plane view of a lower substrate in an IPS mode LCD device according to an embodiment of the present invention.

FIG. 5 is a partial plane view of a lower substrate in an IPS mode LCD device according to a first embodiment of the present invention.

Referring to FIG. 5, the IPS mode LCD device includes a lower substrate provided thereon with a gate line 511, a data line 513 crossing the gate line 513 perpendicularly, and a common electrode line 515 disposed in parallel with the gate line 511. It is preferable that the common electrode line 515 formed at a central portion between the gate lines 511. A pixel region P is defined by the gate line 511 and the data line 513.

A thin film transistor (TFT) 517 is a switching element provided at a crossing point of the gate line 511 and the data line 513. On the pixel region P, a common electrode 520 and a pixel electrode 522 are formed. Accordingly, a gate electrode (not shown) of the TFT 517 is connected to the gate line 511, the source electrode (not shown) is connected to the data line 513, and the drain electrode (not shown) is connected to the pixel electrode 522.

Particularly, the pixel electrode 522 is formed in a rectangular shape in a lateral direction at a central portion of the pixel region P. The pixel electrode 522 includes a plurality of pixel electrode bars 522a protruded and extended away from the pixel electrode 522. Preferably, the plurality of pixel electrode bars 522a are symmetrically extending into the pixel region P.

The common electrode 520 is formed overlapping the gate line 511 and the data line 513 in a rectangular frame structure. The common electrode 520 also overlaps the TFT 517. As a result, the common electrode 520 is formed to overlap the gate line 511, the data line 513 and the TFT 517. The common electrode 520 includes a plurality of common electrode bars 520a protruded and extended from the common electrode 520 and integrated with the plurality of pixel electrode bars 522a.

When a voltage is applied between the common electrode bars 520a and the pixel electrode bars 522a, a fringe field is formed therebetween. Alignment of liquid crystal molecules is varied depending on the intensity of the fringe field, thereby displaying an image. Thus, a region between the common electrode 520 and the pixel electrode 522 is called a display area (i.e., a region where alignment of liquid crystal molecules is varied by an application of the fringe field and thereby light is selectively transmitted).

At this time, an identical voltage is applied to the common electrode 520 and the plurality of common electrode bars 520a formed on each pixel region P, through the common electrode line 515. For this purpose, the common electrode line 515 is electrically connected to the common electrode 520 at their intersection.

Also, a color filter layer 530 is formed under the pixel electrode 522 and the common electrode 520 on the pixel region. The color filter layer 530 includes a red (R) sub-color filter, a green (G) sub-color filter, and a blue (B) sub-color filter, in which an appropriate color filter layer is formed to match with each pixel region. In the present invention, the color filter layer 530 and TFT 517 are forming the color filter on thin film transistor (COT) structure.

In FIG. 5, each of the pixel electrode 522 and the common electrode 520 has a stacked structure of a transparent metal layer and a colored metal layer. Accordingly, the common electrode 520 overlapping the gate line 511, the data line 513 and the TFT 517 can be used as a black matrix (BM) layer. As a result, the color filter layer and the BM layer are all formed on the lower substrate as compared to the upper substrate in the IPS mode LCD device of the related art. Hence, since the upper substrate can be used in a bare glass state in the present invention, the manufacturing process is simplified and the production yield can be enhanced. Also, since the common electrode is used as the BM layer, it is not necessary to form the separate BM layer for enhancing the aperture ratio. In addition, by minimizing the interval between the common electrode having the function of the BM layer and the TFT 517, it is possible to shield the optical current generated when light is incident to the TFT 517.

As described above, the transparent metal layer can be formed of oxide metal selected from a transparent conductive metal group consisting of indium tin oxide (ITO) and indium zinc oxide (IZO). Also, the colored metal layer can be formed of metal element selected from a group consisting of chromium (Cr), molybdenum (Mo), titanium (Ti), Tantalum (Ta), and tungsten (W). The colored metal layer has a stacked structure one of Cr, Mo, Ti, Ta, and W and one of the oxide of the metals. The colored metal layer serving as the BM layer, is using the metal that has an excellent property in reflecting light.

The upper substrate in a bare glass state is disposed by a predetermined distance from the lower substrate constructed as above, and the liquid crystal layer is interposed between the upper substrate and the lower substrate by injection or dropping, thereby forming the IPS mode LCD device of the present invention.

Figure 6A:
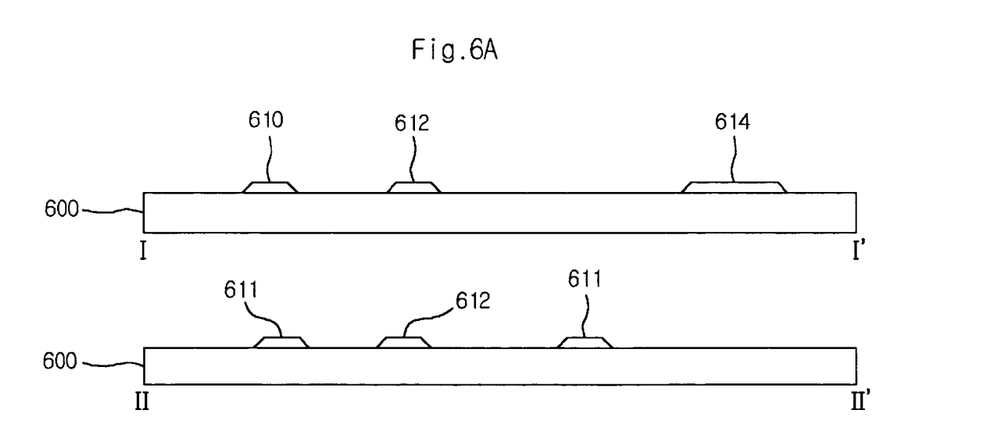
FIGS. 6A through 6E are sectional views taken along cross-sectional lines I–I' and II–II' of FIG. 5.

FIGS. 6A through 6E are sectional views taken along cross-sectional lines I–I' and II–II' of FIG. 5. Referring to FIG. 6A, a conductive metal film is deposited and patterned to form a gate line 611, a gate electrode 610, a common electrode line 612 and a lower electrode 614 of a gate pad.

Figure 6B:
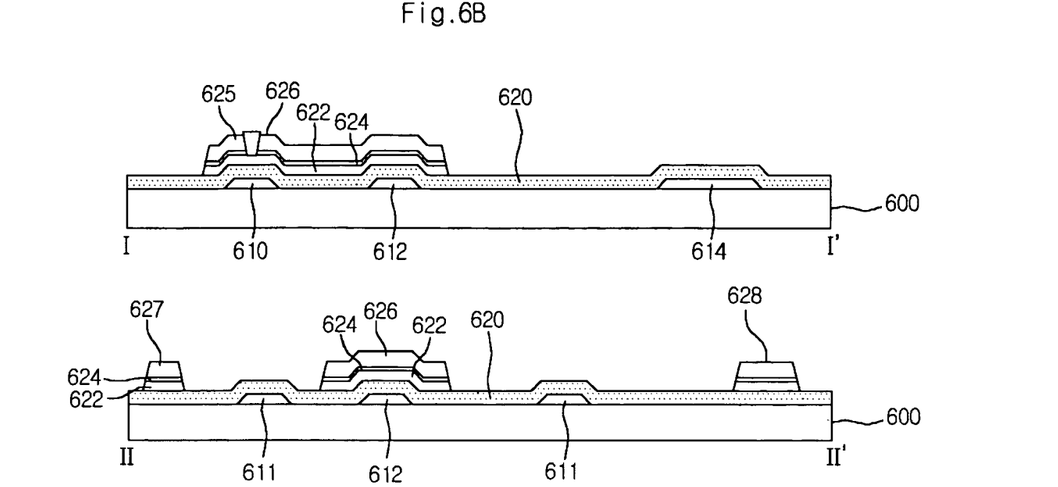

Next, referring to FIG. 6B, an inorganic insulating material such as silicon nitride (SiNx), silicon dioxide (SiO$_2$) or the like, or an organic insulating material such as acryl resin, benzocyclobutene (BCB) or the like is deposited on an entire surface of the substrate 600 including the gate line 611 and the like to form a gate insulating layer 620. Thereafter, a intrinsic amorphous silicon (a-Si) and an impurity-doped amorphous silicon (n+a-Si) are sequentially deposited on the substrate 600 including the gate insulating layer 620, and then a conductive metal is deposited. The intrinsic a-Si, the n+a-Si, and the conductive metal are patterned to form an active layer 622, an ohmic contact layer 624, a data line 627, a source electrode 625, a drain electrode 626 and a lower electrode 628 of a data pad.

Figure 6C:
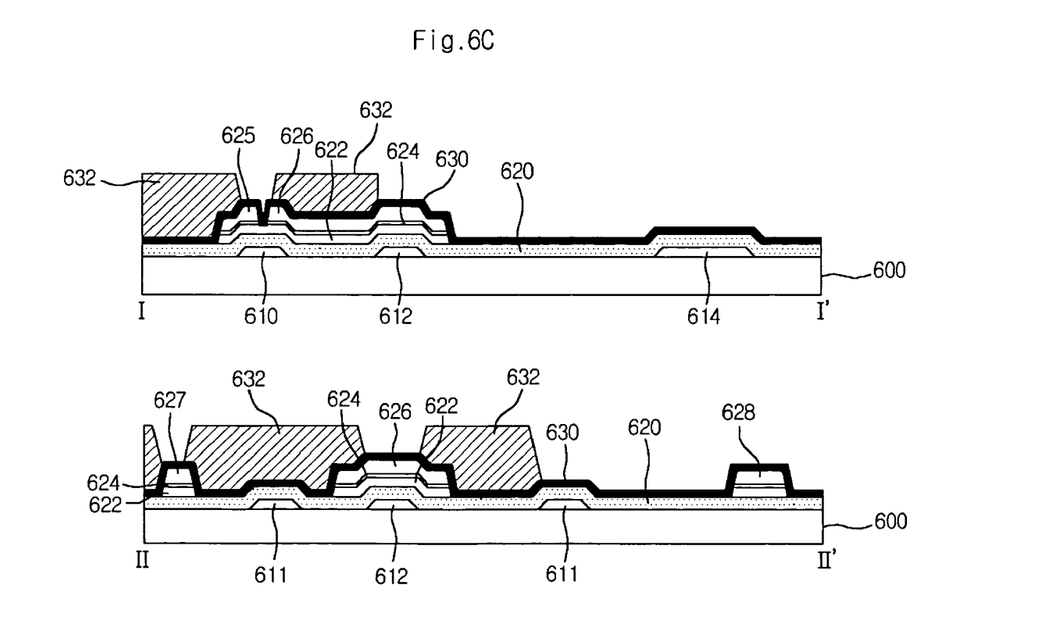

Next, referring to FIG. 6C, a low dielectric material, for example, BCB or acryl resin, is deposited on an entire surface of the substrate 600 including the date line 627 to form a passivation layer 630. Thereafter, a color filter layer 632 is formed on a predetermined region of the passivation layer 630 including the source electrode 625 and the drain electrode 626. The color filter layer 632 can be formed by a pigment dispersing method, a dyeing method, a deposition method, and a printing method.

Figure 6D:
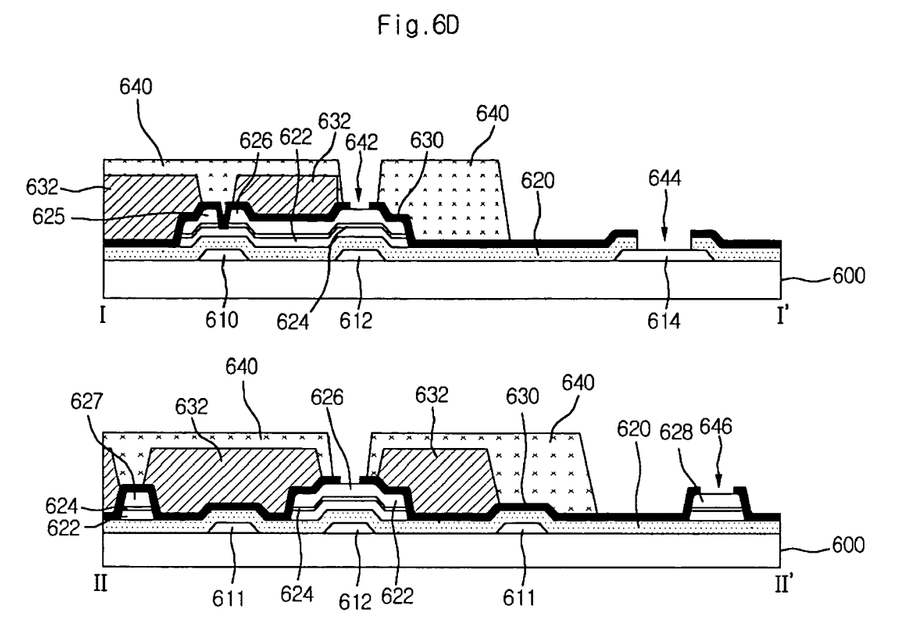

Next, referring to FIG. 6D, an overcoat (OC) layer 640 is deposited on the substrate 600 including the color filter layer 632 to planarize the substrate 600 where the color filter layer 632 is formed. Thereafter a subsequent patterning process is performed to form a drain contact hole 642. Also, pad contact holes 644 and 646 are formed to expose the lower electrode 614 of the gate pad and the lower electrode 628 of the data pad.

Figure 6E:
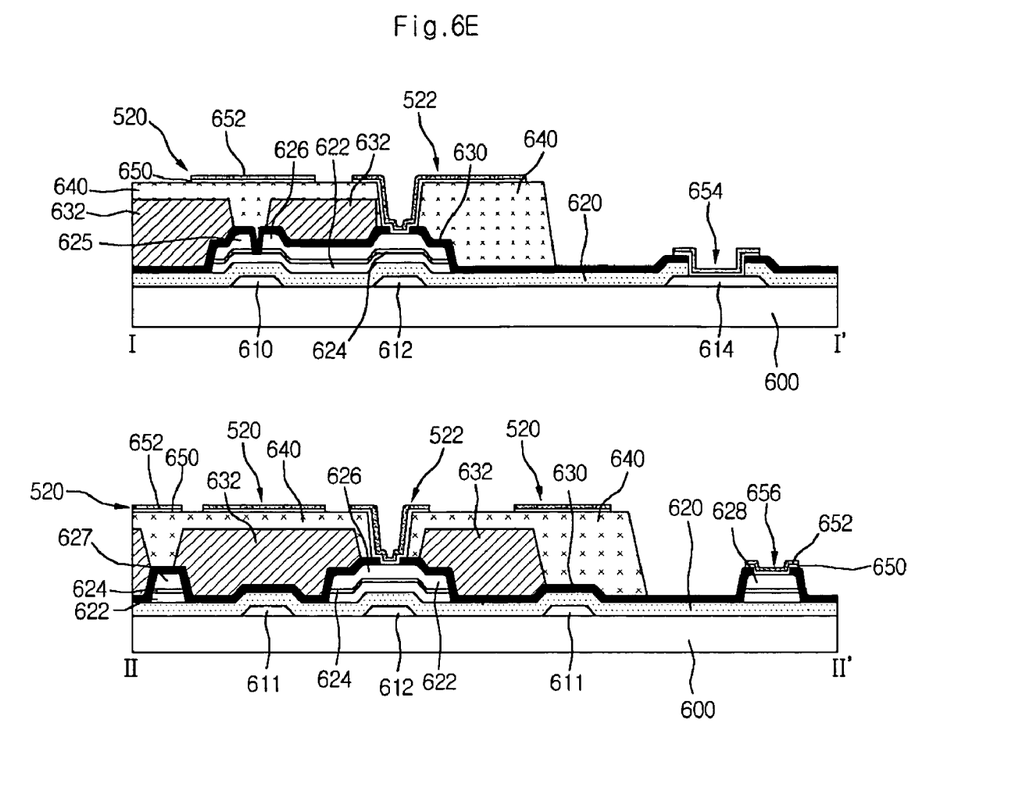

Next, referring to FIG. 6E, a pixel electrode 522 and a common electrode 520 are formed on a predetermined region of the OC layer 640 and in the contact holes 644 and 646. The pixel electrode 522 and the common electrode 520 are formed at the corresponding regions shown in FIG. 5, arranged in a stacked structure of a transparent metal layer 650 and a colored metal layer 652. In other words, the transparent metal layer 650 and the colored metal layer 652 are sequentially deposited and patterned to form the pixel electrode 522 and the common electrode 520 shown in FIGS. 5 and 6E. The transparent metal layer 650 and the colored metal layer 652 can be deposited in a reverse order. However, it is noted that metal layers 654 and 656 formed at the pads should be disposed below the transparent metal layer 650 to ensure reliable subsequent TAB process or should be formed wider than the colored metal layer 652 to expose the metal layers 654 and 656.

Hence, the pixel electrode 522 is connected to the TFT 517 of the pixel region P and the pixel electrode bars 522a are protruded and extended from the pixel electrode 522. Also, the common electrode 520 including the plurality of common electrode bars 520a protruded and extended from the common electrode 520 are integrated with the pixel electrode bars 522a. At this time, the common electrode 520 is formed overlapping the gate line 511, the data line 513 and the TFT 517, and can be used as a BM layer. In other words, as described above, since the common electrode 520 is formed of a colored metal having a property that does not reflect light, it functions as the BM layer. Accordingly, the IPS mode LCD device according to the present invention does not need a separate BM layer and thus, the manufacturing costs can be minimized.

Also, the transparent metal layer 650 is formed of oxide metal selected from the transparent conductive metal group consisting of ITO and IZO. The colored metal layer 652 is formed of metal element selected from the group consisting of Cr, Mo, Ti, Ta and W, and forming a stacked structure one of Cr, Mo, Ti, Ta and W and one of the oxide metals.

When the lower substrate is manufactured by the process described above, the upper substrate can be used in a bare glass state. In the related art, IPS mode LCD device shown in FIG. 4 teaches that the upper substrate is provided with the color filter layer in which the red (R) sub-color filter, the green (G) sub-color filter and the blue (B) sub-color filter are alternatively arranged, and the BM layer is formed between the sub-color filters. The BM layer is formed at a portion where a back light is prevented from transmitting to the lower substrate (i.e., on a predetermined region of the upper substrate, for example, region where the OC layer is formed over the color filter layer and the BM layer). Unlike in the related art IPS mode LCD device, in the IPS mode LCD device according to the first embodiment, since the color filter layer and the BM layer are all disposed on the lower substrate, thus the OC layer does not need to be formed on the upper substrate. As a result, the upper substrate can be made by a transparent substrate only. According to the present invention, since the upper substrate can be made in a bare glass state, the manufacturing process is simplified and the production yield are enhanced. In addition, since the color filter layer and the BM layer can be all formed on the lower substrate, the aperture ratio is improved and the optical current of the TFT can be completely blocked.

Figure 7:
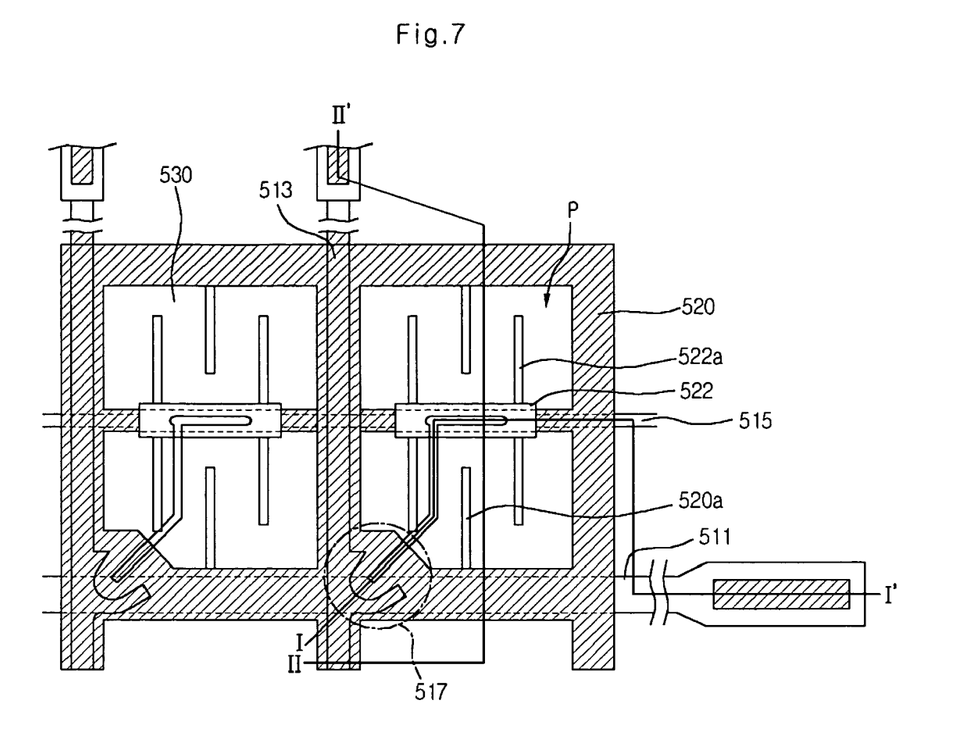
FIG. 7 is a partial plane view of a lower substrate in an IPS mode LCD device according to another embodiment of the present invention.

FIG. 7 is a partial plane view of a lower substrate in an IPS mode LCD device according to a second embodiment of the present invention. When comparing the IPS mode LCD device shown in FIG. 7 with the IPS mode LCD device shown in FIG. 5, the IPS mode LCD device shown in FIG. 7 has a difference in that the pixel electrode 522, the pixel electrode bars 522*a* and the common electrode bars 520*a* are formed of a transparent metal layer. The common electrode 520 overlapping the gate line 511, the data line 513 and the TFT 517 has a stacked structure of a transparent metal layer and a colored metal layer, and can be used as the BM layer. Accordingly, the region where the colored metal layer is formed can function as the BM layer. Also, since the pixel electrode 522, the pixel electrode bars 522*a* and the common electrode bars 520*a* are made of the transparent metal, the aperture ratio is enhanced.

In describing the structure of FIG. 7, the same reference numbers will be used throughout the drawings to refer to the same or like parts as those in FIG. 5. Referring to FIG. 7, the IPS mode LCD device according to a second embodiment of the present invention includes a lower substrate provided thereon with a gate line 511, a data line 513 crossing the gate line 511 perpendicularly, and a common electrode line 515 disposed in parallel with the gate line 511. It is preferable that the common electrode line 515 is formed at a central portion between the gate lines 511. A pixel region P is defined by the gate line 511 and the data line 513.

A thin film transistor (TFT) 517 is a switching element provided at a crossing point of the gate line 511 and the data line 513. A common electrode 520 and a pixel electrode 522 are formed on the pixel region P. Accordingly, a gate electrode (not shown) of the TFT 517 is connected to the gate line 511, the source electrode (not shown) is connected to the data line 513, and the drain electrode (not shown) is connected to the pixel electrode 522.

Particularly, the pixel electrode 522 is formed in a lateral direction at a central portion of the pixel region P. The pixel electrode 522 includes a plurality of pixel electrode bars 522*a* protruded and extended away from the pixel electrode 522. Preferably, the plurality of pixel electrode bars 522*a* are symmetrically extended into the pixel region P.

The common electrode 520 is formed overlapping the gate line 511 and the data line 513 in a rectangular frame structure. The common electrode 520 also overlaps the TFT 517. As a result, the common electrode 520 overlaps the gate line 511, the data line 513 and the TFT 517. The common electrode 520 includes a plurality of common electrode bars 520*a* protruded and extended from the common electrode 520 and integrated with the plurality of pixel electrode bars 522*a*.

When a voltage is applied between the common electrode bars 520*a* and the pixel electrode bars 522*a*, a fringe field is formed therebetween. Alignment of liquid crystal molecules is varied depending on intensity of the fringe field, thereby displaying an image. Thus, a region between the common electrode 520 and the pixel electrode 522 is called a display area (i.e., a region where alignment of liquid crystal molecules is varied by an application of the fringe field and thereby light is selectively transmitted).

At this time, an identical voltage is applied, through the common electrode line 515, to the common electrode 520 and the plurality of common electrode bars 520*a* formed on each pixel region P. For this purpose, the common electrode line 515 is electrically connected to the common electrode 520 at their crossing point. Also, a color filter layer 530 is formed under the pixel electrode 522 and the common electrode 520 on the pixel region. The color filter layer 530 includes a red (R) sub-color filter, a green (G) sub-color filter, and a blue (B) sub-color filter, in which an appropriate color filter layer is formed to match with each pixel region. In the present invention, the color filter layer 530 and TFT 517 have a color filter on thin film transistor (COT) structure.

It is preferable that the pixel electrode bars 522*a* protruded and extended from the pixel electrode 522, and the common electrode bars 520*a* protruded and extended from the common electrode 520 are made of a transparent metal. Also, it is preferable that the common electrode 520 overlapping the gate line 511, the data line 513 and the TFT 517 has a stacked structure of a transparent metal layer and a colored metal layer, so that the common electrode 520 can be used as a black matrix (BM) layer.

As a result, the color filter layer and the BM layer are all formed on the lower substrate as compared to the upper substrate in the IPS mode LCD device of the related art. Hence, in the present invention, since the upper substrate can be used in a bare glass state, the manufacturing process is simplified and the production yield is enhanced. Also, since the common electrode 520 is used as the BM layer, an interval between the common electrode 520 having the function as the BM layer and the TFT 517 is minimized, thereby blocking the optical current generated when light is incident to the TFT 517.

In the above, the transparent metal layer can be formed of oxide metal selected from a transparent conductive metal group consisting of indium tin oxide (ITO) and indium zinc oxide (IZO). Also, the colored metal layer can be formed of metal element selected from a group consisting of chromium (Cr), molybdenum (Mo), titanium (Ti), Tantalum (Ta), and tungsten (W). The colored metal layer has a stacked structure one of Cr, Mo, Ti, Ta and W and one of the oxide metals. The colored metal layer serving as the BM layer, is using the metal that has an excellent property in reflecting light. The upper substrate in a bare glass state is disposed by a predetermined distance from the lower substrate constructed as above, and the liquid crystal layer is interposed between the upper substrate and the lower substrate by injection or dropping, thereby forming the IPS mode LCD device of the present invention.

FIGS. 8A through 8E are sectional views taken along cross-sectional lines I–I' and II–II' of FIG. 7. Since the description regarding FIGS. 8A through 8D are the same as that of FIGS. 6A through 6D, it will be omitted. In describing the process of FIG. 8E, the same reference numbers will be used to refer to the same or like parts.

Figure 8A:
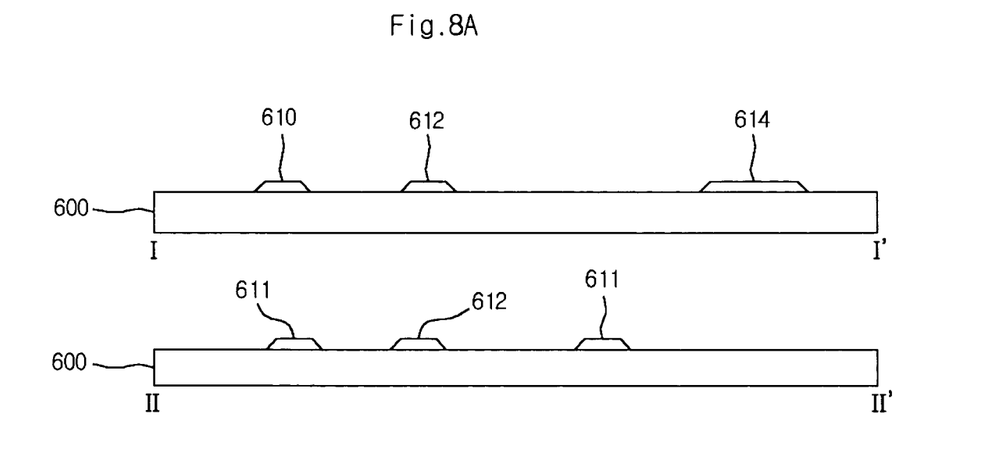
FIGS. 8A through 8E are sectional views taken along cross-sectional lines I–I' and II–II' of FIG. 7.
Figure 8B:
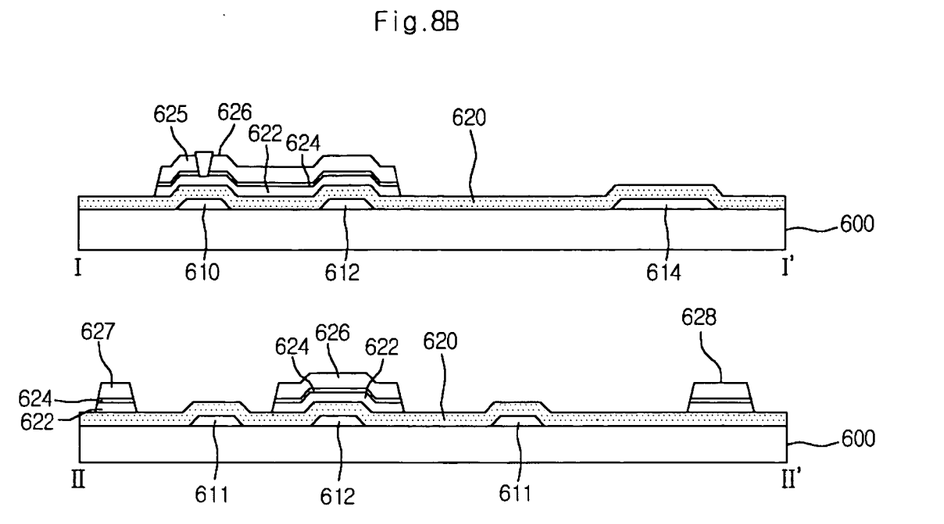
Figure 8C:
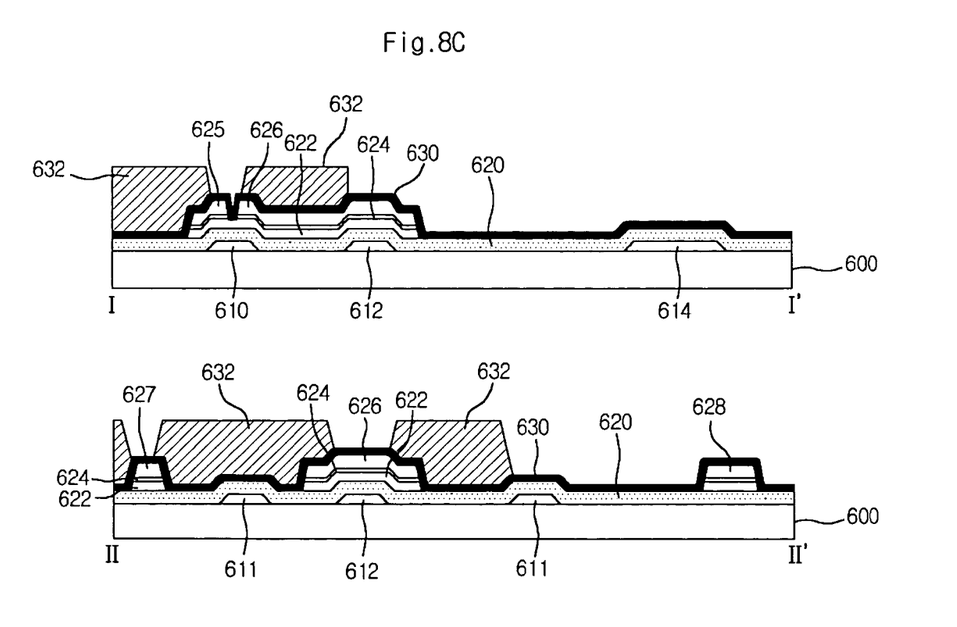
Figure 8D:
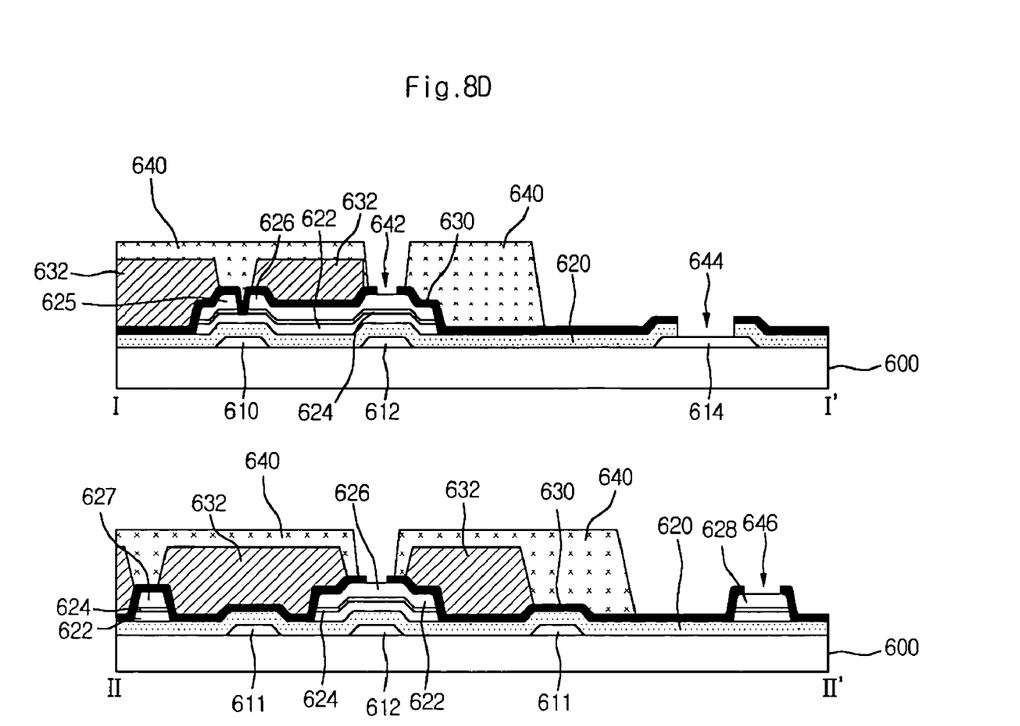
Figure 8E:
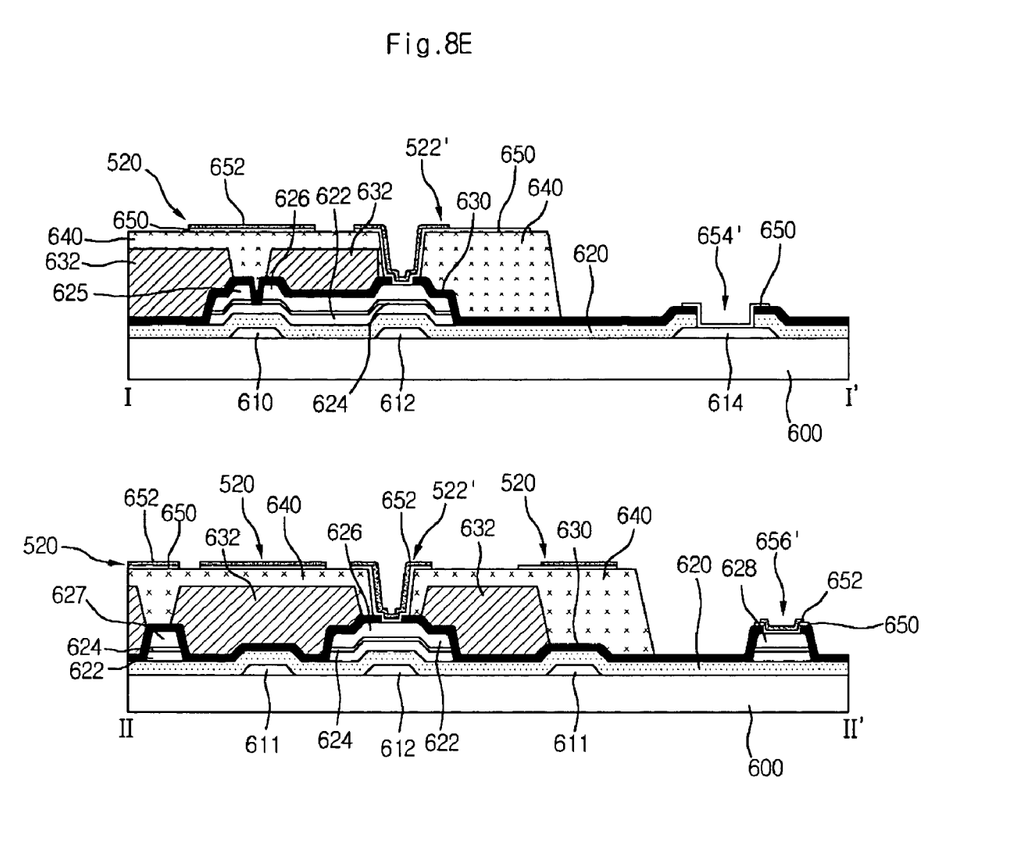

Referring to FIG. 8E, a pixel electrode 522' and a common electrode 520 are formed on a predetermined region of the OC layer 640 and in the drain contact hole 642 and the pad contact holes 644 and 646. The pixel electrode 522' and the common electrode 520 are formed at the corresponding regions shown in FIG. 7, arranged in a stacked structure of a transparent metal layer 650 and a colored metal layer 652. In other words, the transparent metal layer 650 is deposited and patterned, thereby forming the transparent metal layer on regions of the pixel electrode 522', the pixel electrode bars 522a and the common electrode 520, and the regions of the pad contact holes 644 and 646. Thereafter, the colored metal layer 652 is deposited and patterned, thereby forming the colored metal layer 652 on the region of the common electrode 520 other than the pixel region (i.e., the region including the data line 513, the gate line 511 and the TFT 517, and on the transparent metal layer 650 formed in the pad contact hole 646 region).

Herein, it is noted that in the pad contact hole 646 region, the transparent metal layer 650 should be formed wider than the colored metal layer 652 to ensure reliable subsequent TAB process such that the transparent metal layer 650 is exposed. Hence, the pixel electrode 522 is connected to the TFT 517 of the pixel region P and the pixel electrode bars 522a are protruded and extended from the pixel electrode 522'. Also, the common electrode 520 including the plurality of common electrode bars 520a protruded and extended from the common electrode 520, in which the common electrode bars 520a are integrated with the pixel electrode bars 522a. The common electrode 520 is formed overlapping the gate line 511, the data line 513 and the TFT 517, and can be used as a BM layer.

At this point, the pixel electrode 522', the pixel electrode bars 522a and the common electrode bars 520a on the pixel region P are formed of the transparent metal layer 650, and the common electrode 520 has a stacked structure of the transparent metal layer 650 and the colored metal layer 652. Hence, the common electrode 520 overlapping the gate line 511, the data line 513 and the TFT 517 can be used as the BM layer. The colored metal layer 652 is formed of a metal having an excellent property in reflecting light, thus it functions as the BM layer. Also, since the pixel electrode 522', the pixel electrode bars 522a and the common electrode bars 520a on the pixel region P are formed of the transparent metal layer 650, the aperture ratio can be improved.

In addition, the transparent metal layer 650 is formed of oxide metal selected from the transparent conductive metal group consisting of ITO and IZO. The colored metal layer 652 is formed of metal element selected from the group consisting of Cr, Mo, Ti, Ta and W, and has a stacked structure one of Cr, Mo, Ti, Ta and W and one of the oxide metals.

When the lower substrate is manufactured by the process described above, the upper substrate can be manufactured to have a bare glass state. That is, in the related art IPS mode LCD device shown in FIG. 4, the upper substrate is provided with the color filter layer in which the red (R) sub-color filter, the green (G) sub-color filter and the blue (B) sub-color filter are alternatively arranged, and the BM layer formed between the sub-color filters. The BM layer is formed at a portion where a back light is prevented from transmitting to the lower substrate (i.e., on a predetermined region of the upper substrate, for example, the OC layer formed over the color filter layer and the BM layer). Unlike in the related art IPS mode LCD device, in the IPS mode LCD device according to the second embodiment of the present invention, since the color filter layer and the BM layer are all disposed on the lower substrate, thus the OC layer does not need to be formed on the upper substrate. Accordingly, the upper substrate can be made of a transparent substrate only. Since the upper substrate can be made in a bare glass state, the manufacturing process is simplified and the production yield are enhanced. Also, since the color filter layer and the BM layer can be all formed on the lower substrate, the aperture ratio is improved and the optical current of the TFT can be completely blocked.

It will be apparent to those skilled in the art that various modifications and variations can be made in the IPS mode LCD device of the present invention without departing from the spirit or scope of the invention. Thus, it is intended that the present invention cover the modifications and variations of this invention provided they come within the scope of the appended claims and their equivalents.

What is claimed is:

1. A lower substrate for an IPS mode LCD device, comprising:
    a substrate;
    a gate line formed on the substrate;
    a data line formed on the substrate crossing the gate line, a pixel region defined by intersections of the gate line with first and second data lines;
    a thin film transistor connected to the gate line and the first data line;
    a pixel electrode formed at the pixel region and connected to the thin film transistor, the pixel electrode having a plurality of first bars and having a stacked structure of a transparent oxide metal layer and a colored metal layer;
    a common electrode formed overlapping the gate line, the data lines and the thin film transistor, the common electrode having a plurality of second bars integrated with the first bars of the pixel electrode and having a stacked structure of a transparent metal oxide layer and a colored metal layer; and
    a color filter layer disposed at positions corresponding to the pixel region of the substrate.

2. The lower substrate according to claim 1, wherein the color filter layer is formed on the thin film transistor.

3. The lower substrate according to claim 1, wherein the common electrode is used as a light shielding layer.

4. The lower substrate according to claim 1, wherein the transparent metal oxide layer is formed of oxide metal selected from a transparent conductive metal group consisting of indium tin oxide (ITO) and indium zinc oxide (IZO).

5. The lower substrate according to claim 1, wherein the colored metal layer is formed of metal element selected from a group consisting of Cr, Mo, Ti, Ta and W.

6. The lower substrate according to claim 1, wherein the colored metal layer has a stacked structure with one of Cr, Mo, Ti, Ta and W and one of the oxide metals.

7. The lower substrate according to claim 1, wherein the pixel electrode, the plurality of first bars of the pixel electrode, and the plurality of second bars of the common electrode on the pixel region are made of a transparent metal oxide material.

8. The lower substrate according to claim 7, wherein the common electrode is used as a light shielding layer.

9. The lower substrate according to claim 7, wherein the transparent metal oxide layer is formed of oxide metal selected from the transparent conductive metal group consisting of ITO and IZO.

10. The lower substrate according to claim 7, wherein the colored metal layer is formed of metal element selected from the group consisting of Cr, Mo, Ti, Ta and W.

11. The lower substrate according to claim 7, wherein the colored metal layer has a stacked structure with one of Cr, Mo, Ti, Ta and W and one of the oxide metals.

12. The lower substrate according to claim 1, wherein the pixel electrode is formed at a central portion of the pixel region.

13. An IPS mode LCD device, comprising:
a lower substrate including:
a substrate,
first and second of gate lines formed on the substrate,
a data line formed on the lower substrate crossing the first and second gate lines, a pixel region defined by intersections of the first and second gate lines with first and second data lines,
a thin film transistor connected to the first gate line and the first data line,
a pixel electrode formed at the pixel region and connected to the thin film transistor, the pixel electrode having a plurality of first bars and having a stacked structure of a transparent metal oxide layer and a colored metal layer,
a common electrode formed overlapping the gate line, the data line and the thin film transistor, the common electrode having a plurality of second bars integrated with the first bars of the pixel electrode and having a stacked structure of a transparent metal oxide layer and a colored metal layer, and
a color filter layer disposed at positions corresponding to the pixel region of the lower substrate;
an upper substrate spaced by a predetermined interval from the lower substrate; and
a liquid crystal layer interposed between the upper substrate and the lower substrate.

14. A method for manufacturing a lower substrate for an IPS mode LCD device, the method comprising:
forming a gate line on a substrate;
forming a data line on the substrate to cross the gate line, a pixel region defined by intersections of the gate line with the data line;
forming a thin film transistor connected to the gate line and the data line;
forming a color filter layer on the pixel region including the gate line, the data line and the thin film transistor; and
forming a pixel electrode and a common electrode on the color filter layer, the pixel electrode being connected to the thin film transistor and having a plurality of first bars, the common electrode overlapping the gate line, the data line and the thin film transistor and having a plurality of second bars integrated with the plurality of first bars of the pixel electrode, and the common electrode having a stacked structure of a transparent metal oxide layer and a colored metal layer.

15. The method according to claim 14, wherein the pixel electrode has a stacked structure of a transparent metal oxide layer and a colored metal layer.

16. The method according to claim 14, wherein the common electrode is used as a light shielding layer.

17. The method according to claim 15, wherein the transparent metal oxide layer is formed of oxide metal selected from a transparent conductive metal group consisting of ITO and IZO.

18. The method according to claim 15, wherein the colored metal layer is formed of metal element selected from a group consisting of Cr, Mo, Ti, Ta and W.

19. The method according to claim 15, wherein the colored metal layer has a stacked structure with one of Cr, Mo, Ti, Ta and W and one of the oxide metals.

20. The method according to claim 14, wherein the pixel electrode, the first bars of the pixel electrode, and the second bars of the common electrode on the pixel region are made of a transparent metal oxide material.

21. The method according to claim 20, wherein the common electrode is used as a light shielding layer.

22. The method according to claim 20, wherein the transparent metal oxide layer is formed of oxide metal selected from the transparent conductive metal group consisting of ITO and IZO.

23. The method according to claim 20, wherein the colored metal layer is formed of metal element selected from the group consisting of Cr, Mo, Ti, Ta and W.

24. The method according to claim 20, wherein the colored metal layer has a stack structure with one of Cr, Mo, Ti, Ta and W and one of the oxide metals.

25. The method according to claim 14, wherein the pixel electrode is formed at a central portion of the pixel region.

26. A method for manufacturing an IPS mode LCD device, the method comprising:
forming a gate line on a lower substrate;
forming a data line on the substrate to cross the gate line, a pixel region defined by intersections of the gate line with the data line;
forming a thin film transistor connected to the gate line and the data line;
forming a color filter layer on the pixel region including the gate line, the data line and the thin film transistor;
forming a pixel electrode and a common electrode on the color filter layer, the pixel electrode being connected to the thin film transistor and having a plurality of first bars, the common electrode overlapping the gate line, the data line and the thin film transistor and having a plurality of second bars integrated with the plurality of first bars of the pixel electrode, and the common electrode having a stacked structure of a transparent metal oxide layer and a colored metal layer;
joining an upper substrate with the lower substrate with a predetermined interval therebetween; and
interposing a liquid crystal layer between the upper substrate and the lower substrate.

* * * * *